United States Patent [19]
Birze et al.

[11] Patent Number: 6,058,396
[45] Date of Patent: May 2, 2000

[54] PRODUCT INTERFACE METHOD AND SYSTEM WHICH ALLOW CLASS EVOLUTION

[75] Inventors: Brigitte B. Birze, Plano; Thomas J. Traughber, Austin, both of Tex.

[73] Assignee: Sterling Software, Inc., Dallas, Tex.

[21] Appl. No.: 09/015,670

[22] Filed: Jan. 29, 1998

Related U.S. Application Data

[60] Provisional application No. 60/037,839, Feb. 6, 1997.

[51] Int. Cl.$^7$ .................................................... G06F 17/30
[52] U.S. Cl. ......................... 707/103; 707/104; 709/305
[58] Field of Search .................................... 707/102, 103, 707/104; 709/305, 303, 101; 364/140, 281, 282, 285; 345/961; 714/38

[56] References Cited

U.S. PATENT DOCUMENTS

| | | | |
|---|---|---|---|
| 5,339,430 | 8/1994 | Lundin et al. | 709/305 |
| 5,555,418 | 9/1996 | Nilsson et al. | 709/305 |
| 5,659,751 | 8/1997 | Heninger | 709/305 |
| 5,850,548 | 12/1998 | Williams | 395/701 |
| 5,901,314 | 5/1999 | Boehme et al. | 395/701 |

OTHER PUBLICATIONS

Coplien, James O.; "Advanced C++ Programming Styles and Idioms"; Jan. 1992; pp. 279–355.

Gamma, Erich; Helm, Richard; Johnson, Ralph; Vlissides, John; "Design Patterns, Elements of Reusable Object–Oriented Software"; Oct. 1994; pp. 1–31, 87–95, 139–150 and 151–161.

Eliëns, Anton; "Principles of Object–Oriented Software Development"; 1994; pp. 251–325.

*Primary Examiner*—Wayne Amsbury
*Assistant Examiner*—Thu-Thao Havan
*Attorney, Agent, or Firm*—Baker Botts L.L.P.

[57] ABSTRACT

The present invention provides for an object-oriented software product interface method which gives a tighter coupling between the software product interface and internals than traditional methods. The product interface scheme includes a Factory Class (44) and an Interface Class (46) which control object life cycles; bend compile-time time and runtime type checking; bind virtual abstract interface classes and hidden internal class hierarchies through multiple inheritance; and provide interface parameter abstraction. The present invention thus provides users of the software product with a stable product interface while preserving the designer's freedom to modify the software product's internal architecture.

7 Claims, 2 Drawing Sheets

PRODUCT INTERFACE METHOD AND SYSTEM WHICH ALLOW CLASS EVOLUTION

CROSS REFERENCE TO RELATED APPLICATIONS

This application claims priority under 35 USC §119 of provisional application No. 60/037,839 filed Feb. 6, 1997.

TECHNICAL FIELD OF THE INVENTION

This invention relates generally to object-oriented software and in particular to a method and system for providing a product interface which allows class evolution.

BACKGROUND OF THE INVENTION

Ideally, software product libraries provide a public view of offered services while hiding implementation details. Separating the public view, or product interface, from the internal implementation details, or private view, allows developers to modify the product without impacting current users. Decoupling the product interface from the internal implementation details, however, is a problem particularly when the interface consists of C++ classes.

A C++ class's private and public views coexist in the class declaration bringing the internal implementation details of the class into the class user's world. As the class evolves to accommodate changing requirements or additional functionality, users of the class must recompile their applications with the new definition regardless of whether or not the change impacts them.

There are, however, several traditional patterns for providing a firewall between a C++ class' behavior and its internals. Use of exemplars and the letter envelope algorithms are two well-known firewall interfaces [see, for example, the book *Advanced C++ Programming: Styles and Idioms* by James O. Coplien, published in 1992 by Addison-Wesley].

Exemplars support program evolution by exploiting the runtime flexibility of objects to overcome the compile-time nature of classes. Objects take the role traditionally played by classes of defining the runtime object, while classes play the role normally fulfilled by the metaclass. Exemplars accomplish this through objects that perform C++ compiler work during runtime and through generalization of parameter signatures.

In the letter envelope algorithm a lightweight interface object, the envelope, sends messages to the associated internal, or letter, object. The two objects accomplish work by sending messages between themselves. The envelope exposes services of the class while the letter deals with implementation of the services.

Both of these traditional patterns allow the development of class interfaces that hide the implementation of the internal class from the user. However, this advantage comes at the price of loosely coupled classes and generalization or multiple objects needed to do the work of one. Furthermore, without the benefit of C++ strict type checking runtime checks must be performed for errors normally caught at compile-time. These side effects make the application interface more difficult to maintain, prone to runtime errors, and brittle with regard to internal hierarchy updates.

Thus, what is needed is a method to expose class services to an application in a view that is complete enough to allow non-trivial use yet hides all implementation details to allow class evolution. The interface must be a black box object that presents a consistent view of the services offered regardless of the potential varied internal implementations. Furthermore, the interface must provide for close coupling between the internal and interface classes to flag errors at compile-time. Further still, the interface must maintain runtime flexibility and limit object bloat as the product evolves.

SUMMARY OF THE INVENTION

The present invention is a product interface scheme of algorithms and patterns. The scheme provides users with a stable application interface while preserving the product designer's freedom to modify the internal architecture.

The product interface scheme of the present invention provides algorithms and patterns that provide a tighter coupling between the product interface and internals than traditional methods.

The product interface scheme of the present invention binds virtual abstract interface classes and hidden internal class hierarchies through multiple inheritance to preserve compile-time checking and limit runtime object bloat.

The product interface scheme of the present invention also uses factories which blend compile-time and runtime checking to enforce the construction constraints of their object products. The scheme allows protection of object life cycles through controlled creation and destruction methods.

Additionally, the product interface scheme of the present invention utilizes parameter abstraction that provides skinny construction signatures and insulates derived classes from base class construction requirements.

One embodiment of the scheme allows users of the product to program to an interface, not an implementation. It also provides a robust interface since it allows developers and users of the product the benefits of C++'s strict type checking. Class developers also benefit from lower runtime complexity since class users can invoke an internal object's methods without the assistance of an additional envelope or bridge object.

These and other features of the invention will be apparent to those skilled in the art from the following detailed description of the invention, taken together with the accompanying drawings.

DETAILED DESCRIPTION OF THE INVENTION

The product interface scheme of the present invention provides runtime flexibility and compile-time error detection while insulating users from product evolution. The interface scheme of the present invention is discussed hereinbelow beginning with simple problems and then moving to more complex systems and extensions.

Figure 1:
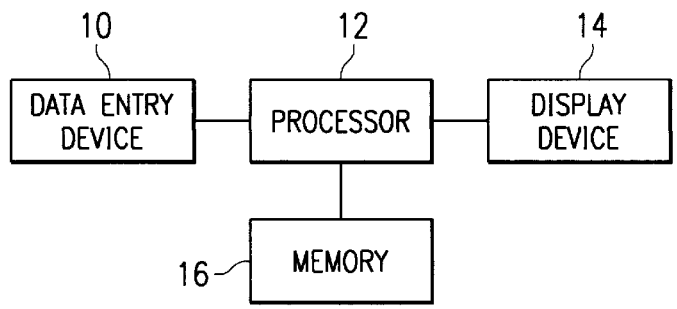
FIG. 1 shows a block diagram of a computer system used in implementing the present invention.

FIG. 1 illustrates a system operable to implement the present invention. The system includes a processor 12, a data entry device 10, a display device 14 and a memory 16. It is contemplated that C++ is used in implementing the present invention on the system shown in FIG. 1 but, it is further contemplated that another object-oriented programming language may be used.

Figure 2:
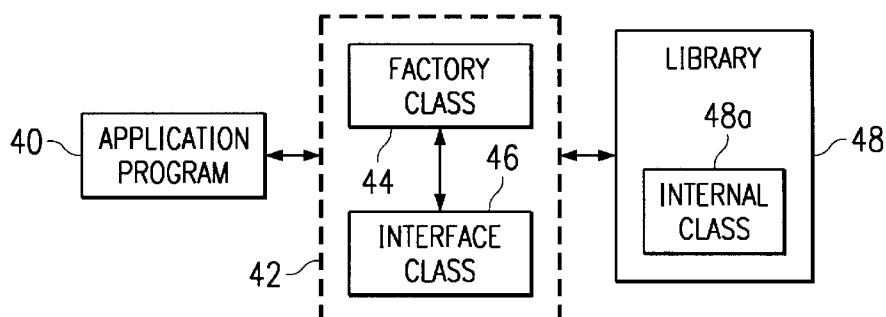
FIG. 2 shows a block diagram of a system in accordance with the present invention.

FIG. 2 is a block diagram of a system in accordance with the present invention. The system shown in FIG. 2 includes an object-oriented Library 48 which contains an Internal Class 48a which implements the services provided by the Library 48. Also included is an Application Interface 42 including an Interface Class 46 which exposes services provided by an object-oriented Library 48 to an Application Program 40 and a Factory Class 44 which creates objects from the Internal Class 48a in the object-oriented Library 48. The objects created from the Internal Class 48a implementing functions to provides the Library 48 services exposed to the Application Program 40. The Interface Class 46 is an abstract class consisting of pure virtual functions. The Interface Class 46 advertises the services of Internal Class 48a which perform the services of the Library 48. However, the Interface Class 46 does not expose the implementation details of the Internal Class 48a to the Application Program 40. The Internal Class 48a inherits the Interface Class 46 and provides the implementation of the virtual functions defined in the Interface Class 46.

Figure 3:
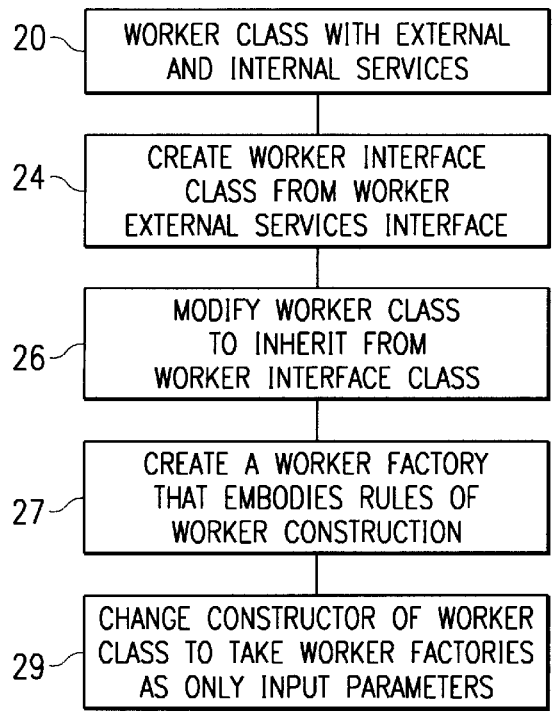
FIG. 3 is a flow diagram illustrating the process of creating the interface in FIG. 2.

FIG. 3 is flow diagram illustrating the process of creating the interface in FIG. 2. Although illustrating a particular sequence of operation, it is contemplated that the particular sequence shown is only illustrative and that other sequences, including operation of one or more of the illustrated operations in parallel, will be readily apparent to one skilled in the art.

Figure 4:
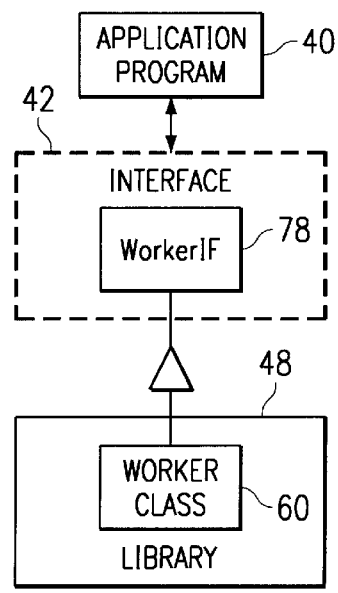
FIG. 4 shows an exemplary simple hierarchy provided with an interface class in accordance with the present invention.

We will use the class Worker, as an example of the Internal Class 48a. As shown at block 20 in FIG. 3, an internal class, Worker is developed which provides services both external to as well as internal to the Library 48. Then, as shown at block 24 in FIG. 3, an interface class 44, WorkerIF, is created from the Worker's interface of services external to the Library 48. The interface class WorkerIF defines the external interface methods of the class Worker as described in more detail hereinbelow. Interface class WorkerIF is an abstract class which defines as pure virtual functions only the methods of the class Worker that the Library 48 exposes to the Application Program 40. Then, as shown in block 26 of FIG. 3, the class Worker is modified to inherit the external interface from WorkerIF while retaining any internal hierarchy inheritance. Internal class Worker provides the implementations of the WorkerIF's virtual functions. FIG. 4 shows the Worker and WorkerIF class hierarchy and illustrative Worker and WorkerIF classes are as follows:

```
class WorkerIF {
public:
    WorkerIF ( );
    virtual ~ WorkerIF( );
    virtual Employee * RequestBoss( )=0;
    virtual int GetWages (float time)=0;
```
```
};
class Worker: public WorkerIF {
public:
    Worker (char* Name);
    virtual ~ Worker( )
    Employee *RequestBoss( );
    virtual int GetWages (float time);
    Bool InternalWork (float duration, int payScale);
protected:
    char *name;
    float time:
};
```

The Application Program 40 sees only the WorkerIF interface when using a Worker object. As shown hereinabove, the WorkerIF class insulates the Application Program 40 from the internals of the Worker class while advertising Worker's product services. The Worker class can have methods which are not exposed external to the Library 48. The Application Program 40 can not see or use internal methods of the Worker class. The Application Program 40 sees only the methods exposed in the WorkerIF (Interface) class. The WorkerIF class defines the Library 48 services as pure virtual functions, which force any class derived from this WorkerIF to supply implementations of the pure virtual functions. Since the Worker class inherits the WorkerIF interface class, inheritance binds the Worker class to provide implementations of the methods, or services, advertised by WorkerIF.

For example, in the example shown hereinabove, the RequestBoss and GetWages interface functions are defined by WorkerIF. The Worker class implements the RequestBoss and the GetWages interface function defined by WorkerIF. Worker also provides an InternalWork method used by the Library's 48 internal objects which is not defined in WorkerIF, and therefore is not visible to the Application Program 40.

Figure 5:
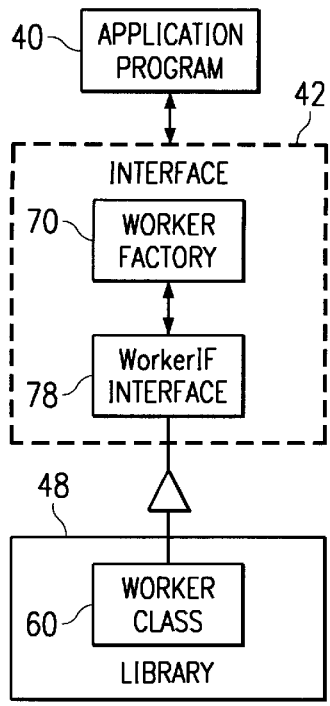
FIG. 5 shows the exemplary simple hierarchy shown in FIG. 4 provided with a factory; in accordance with the present invention.

The WorkerIF class is abstract and, therefore, can not be created by the Application Program 40. Therefore, a Factory Class 42 pattern is introduced to perform object creation as illustrated in the block diagram in FIG. 5. The Factory Class 42 is also introduced in process step 27 in FIG. 3, creating the WorkerFactory that embodied all parts, tools, and the rules of construction to build a Worker object. The WorkerFactory contains a build method which is invoked by the Application Program 40 to create a Worker object which is returned as a WorkerIF handle.

```
class WorkerFactory {
public:
    WorkerFactory (char *name);
    ~WorkerFactory( );
    virtual WorkerIF *build( );
    char *name;
};
```

The method of the present invention insulates the user from the object internals with an abstract interface class and a factory class. However, a class with many configurable parameters can quickly require bloated constructor signatures. The method of the present invention resolves this issues by modifying the Worker constructor to receive the WorkerFactory object as shown in FIG. 3 at block 29 and in the Worker class definition below.

```
class Worker: public WorkerIF {
public:
    Worker (WorkerFactory *fact);
    virtual ~ Worker( )
    Employee *RequestBoss( );
    virtual int GetWages (float time);
    Bool InternalWork (float duration, int payScale);
protected:
    char *name;
    float time:
};
```

Since the WorkerFactory contains all the parts, tools, and assertions needed to build a Worker, the WorkerFactory object is all the Worker constructor needs for a successful object instantiation.

Figure 6:
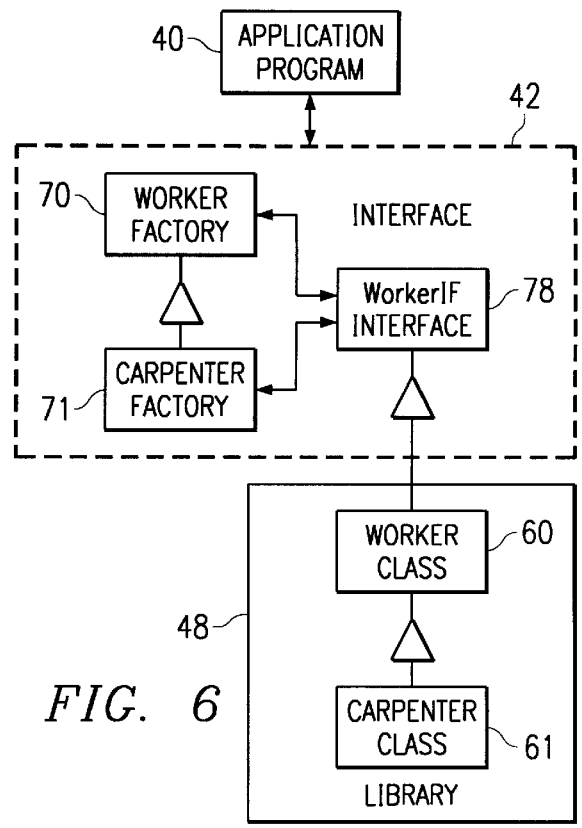
FIG. 6 illustrates a class inherit from a base class.

The Worker class can also be used as a base class to derive different types of Workers. In this example, a second Internal Class 48, Carpenter 61, is derived from the first Internal Class 48a, Worker 60, which also provides external and internal Library 48 services. See FIG. 6. In this example the Worker class provides an implementation of the Request-Boss interface method. However, the virtual GetWages interface function defined by WorkerIF is not implemented by the Worker class but is deferred to the derived Worker type, Carpenter 61.

```
    WorkerIF( );
    virtual ~ WorkerIF( );
    virtual Employee * RequestBoss( )=0;
    virtual int GetWages (float time)=0;
};
class Worker: public WorkerIF {
public:
    Worker (WorkerFactory *fact);
    virtual ~ Worker( )
    Employee *RequestBoss( );
    virtual int GetWages (float time)=0;
    Bool InternalWork (float duration, int payScale);
protected:
    char *name;
};
class Carpenter: public Worker {
    Carpenter (tool *screwdriver, part *screw, char
*name);
    virtual ~ Carpenter( );
    int GetWages(float time);
protected:
    float time:
    tool *screwdriver;
    part *screw;
};
```

With polymorphism, WorkerIF 60 can represent as many forms of Worker as there are derivations, or types of Workers, in the Library 48, for example, Plumber, Electrician and Carpenter Workers. Each of these derivations may need different initialization parameters. Using the present invention, a user is able to create and use the desired Worker type derivations without knowledge of its internal structure or how many derivations exist. However, the user cannot escape the responsibility of knowing the Worker type they are creating and the inputs needed by that Worker type upon construction.

A CarpenterFactory 71 is created to understand the parts, tools, and rules of construction used to build a Carpenter object. The Carpenter Factory 71 is derived from the Worker Factory 70, and therefore, holds the rules of construction for both the Carpenter class and the Worker class.

```
class WorkerFactory {
public:
    WorkerFactory (char *name);
    ~WorkerFactory( );
    virtual WorkerIF *build( );
    char *name;
};
class CarpenterFactory: public WorkerFactory {
public:
    CarpenterFactory (tool *screwdriver, part screw, char
*name);
    ~CarpenterFactory( );
    WorkerIF *build( );
    Error *ChangeTools (tool *screwdriver, part screw);
protected:
    tool *screwdriver;
    part screw;
};
```

WorkerFactory defines the virtual function build( ). Classes that derive from WorkerFactory can provide their own implementation of build( ) to create their associated objects. An Application Program 40 invokes a Factory Class 44 build( ) method to create objects from an Internal Class 48. Thus, the rule that the Application Program 40 must create an instance of a Factory Class 44 to create an instance of an Internal Class 48 is introduced. However, a Factory object is needed only for object construction since it returns a real and whole Internal Class 48a object. The Internal Class 48a object created by the Factory Class 44 object can be used without the aid of any additional objects.

The parts and tools needed for the Factory object to build an Internal object cannot be abstracted away from the Application Program 40. If the Carpenter needs a screwdriver, the Application Program 40 must know it and provide it. Therefore, the instantiation of each Factory Class 44 requires the same parts and tools needed by its product. The Worker requires, but has no constraints on, a name. Therefore, the WorkerFactory constructor requires a name parameter, but the name instance variable is public and can be changed at will by the Application Program 40.

The CarpenterFactory 71 has the constraint that the screwdriver type must match the screw type, for example, Phillips. Therefore, CarpenterFactory 71 enforces this matching rule in its constructor and in the ChangeTools( ) method. Protecting the screwdriver and screw instance variables guarantees the Application Program 40 cannot update them without CarpenterFactory 71 performing assertion checks. Consistent assertion checking ensures screwdriver and screw are a valid pair before the Carpenter constructor receives them.

Normally a class cannot perform parameter checking or assertions until the operating system allocates its memory and enters its constructor. Factory Class 44 objects are lightweight and can be created on the stack while Internal Class 48a objects exposed as Interface Class 46 objects are potentially heavy and are created on the heap. Therefore efficiency is gained by performing the Internal Class 48a object's assertion and parameter type checking in its Factory 46. Since a Factory 46 retains sole rights to creation of its Internal Class 48a object, it can also enforce quota or singleton constraints by restricting the number of objects created. Furthermore, once created, a single Factory 46 object can produce multiple internal objects. The configuration of the Internal Class 48a object created depends on the state of the Factory 46 when the Application Program 40 invokes the build( ) method. The Application Program 40 can set the Factory's 46 state variable values then perform many invocations of build( ) or change the Factory's 46 state variable values between each invocation of build( ). So the Factory 46 assists in creation management of objects with many configurable parameters.

The Factory Class's 46 job is to handle the parts, tools, and assertions needed to build their Internal Class 48a object. Since the CarpenterFactory inherits the WorkerFactory, the CarpenterFactory must be sensitive to changes in the creation part requirements for a Worker class. However, the Carpenter derived internal class is also vulnerable to changes in the creation requirements of the base Worker internal class. To eliminate this constraint, the Carpenter constructor is modified to receive the CarpenterFactory object.

```
class Worker:      public WorkerIF,
                   public Employee{
public:
    Worker (WorkerFactory *fact);
    virtual ~Worker( )
 ... };
class Carpenter: public Worker {
    Carpenter (CarpenterFactory *fact);
    virtual ~Carpenter( );
 ... };
```

Each factory encapsulates the configurable parameters needed to build its interface object. Passing the CarpenterFactory to the Carpenter constructor maintains a skinny signature on the constructor regardless of future additions or changes. Additionally, since the CarpenterFactory derives from the WorkerFactory, the Carpenter constructor can extract the WorkerFactory object from the CarpenterFactory object. The WorkerFactory object can then be passed to the Worker constructor with no knowledge of its contents other than that imposed by the compiler. This insulates all classes derived from Worker from changes in Worker's instantiation requirements. Finally, since Worker has delegated assertions necessary for its creation to the WorkerFactory object, the Carpenter's constructor can be certain the data passed to the Worker constructor is legal.

Products can extend the interface in several ways as needed. Some product architectures, for example, need to control deletion of interface objects created by its users. In this case, the method of the present invention can be extended to protect the Interface Class's 46 destructor and add a static destroy( ) function to the Interface Class 46.

static void destroy (WorkerIF *wrk);
The Application Program 40 invokes destroy( ) on Interface Class 46 objects that are no longer need. However, destroy( ) can simply set the object to a deleted state. This implementation delays actually deletion of the object until all internal cleanup in completed.

Figure 7:
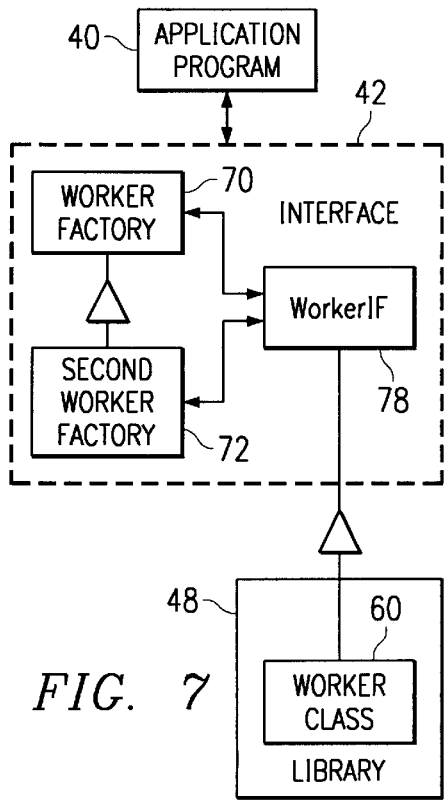
FIG. 7 illustrates evolution of the factories shown in FIG. 5.

The product interface scheme also supports evolution of an Internal Class 48a object's construction. Suppose, for example, the Worker class is extended to allow an additional overtime parameter. This necessitates the addition a new constructor to Worker and WorkerFactory to allow users to exploit the new feature. However, Application Programs currently using the Library 48 and not needing the overtime capabilities should not have to recompile to accommodate the new version of WorkerFactory. Thus, to protect the current Application Programs, a NewWorkerFactory is derived from the existing WorkerFactory. FIG. 7 shows Factory evolution with a second derived NewWorkerFactory 71 which provides the new constructor parameter. New Application Programs 40 would include the NewWorkerFactory with the new features while existing Application Programs 40 continue to use the old WorkerFactory. The new Worker constructor accepts a NewWorkerFactory object while the existing Worker constructor continues to accept an old WorkerFactory object. Thus, the compiler aids in managing class evolution.

Figure 8:
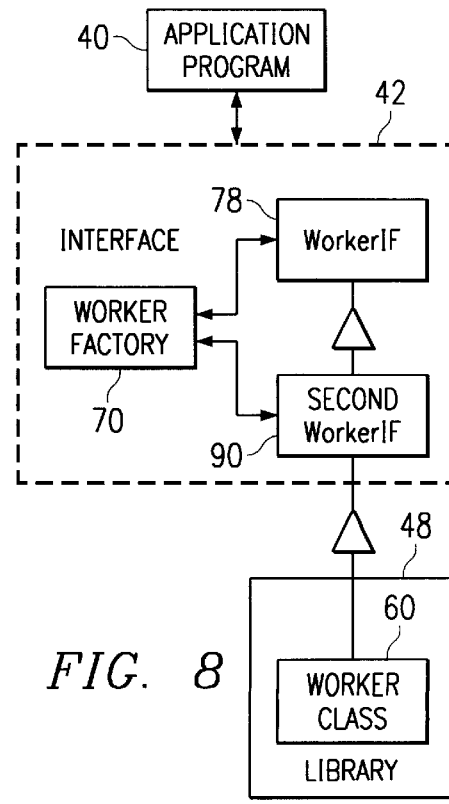
FIG. 8 illustrates evolution of the interface shown in FIG. 5.

The same pattern can be used in evolving the WorkerIF interface 78 to accommodate the addition of new services. FIG. 8 shows interface evolution with the inclusion of a second WorkerIF Interface 90. The second interface 90, for example, exposes new services provided by the base Worker objects.

Thus, the present invention provides for a powerful interface scheme. Internal Classes 48a can evolve at will provided they continue to support the operations advertised by the Interface Classes 46. The compiler (for example a C++ compiler) oversees the Internal Classes' 48a responsibility to Interface Classes 46 by virtue of inheritance. Internal Classes 48a can continue to leverage the power of Internal Class hierarchies by using multiple inheritance of the Interface Class 46 and other Internal Classes. Application Programs 40 wield Factory Class 44 objects to create multiple instances of an Internal Class 48a. Factories Class 44 objects manage the configuration parameters and enforce the rules of constriction for their associated Internal Class 48a. And derived Internal Classes 48a are insulated from their base Internal Classes' 48a construction parameters and creation assertions by the base class's Factory 44.

The compile-time benefits of the interface scheme of the present invention combined with the Factory 44 runtime assertion checks provides a robust interface. Tight coupling between Interface Class 46 and the Internal Class 48a is achieved (virtual functions ensure compliance at compile time). Build assertions are applied before storage allocation. "Skinny" build signatures are provided for (parameters reduced to state of factory). Finally, evolution management techniques are applied which preserve backward compatibility.

Although the present invention and its advantages have been described in detail, it should be understood that various changes, substitutions and alterations can be made herein without departing from the spirit and scope of the invention as defined by the appended claims.

What is claimed is:

1. A system for providing an interface between an object-oriented software library and an application program, the object-oriented software library including a plurality of objects, the system comprising:

an internal class in the object-oriented software library comprising external interface methods and internal services;

an interface class operable to expose the external interface methods to the application program as virtual functions, wherein the internal class is operable to inherit the interface class and provide implementation of the virtual functions defined in the interface class; and a factory class operable to create multiple instances of the internal class, the factory class constructor operable to perform assertion and parameter type checking for the internal class.

2. A method of providing an interface to an object-oriented software library stored in a memory, said object-oriented software library comprised of a plurality of classes, comprising the steps of:

defining a first class in the object-oriented software library, said first class comprised of external interface methods and internal services;

defining a second class in the object-oriented software library, said second class based on said external interface methods of said first class and operable to define as virtual functions only those of said external interface methods which are exposed to users;

modifying said first class to inherit said external interface methods from said second class and to provide implementations of said virtual functions from said second class; and generating a first factory class to allow said users to create multiple instances of said first class, said first factory class constructor operable to perform assertion and parameter type checking for said first class;

modifying constructor parameters of said first class to receive instances of said second factory class.

3. A method of providing an interface to an object-oriented software library stored in a memory, said object-oriented software library comprised of a plurality of classes, comprising the steps of:

defining a first class in the object-oriented software library, said first class comprised of external interface methods and internal services;

defining a second class in the object-oriented software library, said second class based on said external interface methods of said first class and operable to define as virtual functions only those of said external interface methods which are exposed to users;

defining a third class that inherits from said first class;

modifying said first class to inherit said external interface methods from said second class and to provide implementations of said virtual functions from said second class; and generating a first factory class to allow said users to create multiple instances of said first class, said first factory class constructor operable to perform assertion and parameter type checking for said first class;

generating a second factory class to allow said users to create multiple instances of said third class, said second factory class operable to perform assertion and parameter type checking for said third class; and modifying said second factory class to inherit said first factory class; and modifying constructor parameters of said second factory class to receive construction parameters for said first factory class; and modifying constructor parameters of said third class to receive instances of said second factory class.

4. The method of claim 3 wherein said first factory class includes the step of generating said first class which embodies rules of construction of said first class; and wherein said second factory class includes the step of generating said third class which embodies rules of construction of said third class.

5. The method of claim 3 wherein said first factory class is operable to perform assertion and parameter type checking for said first class.

6. The method of claim 3 wherein said second factory class is operable to perform assertion arid parameter type checking for said third class.

7. A system for providing an interface to an object-oriented software library stored in a memory, comprising:

a first class in the object-oriented software library, said first class comprised of external interface methods and internal services;

a second class in the object-oriented software library, said second class based on said external interface methods of said first class and operable to define as virtual functions only those of said external interface methods which are exposed to users, wherein said first class is operable to inherit said external interface methods from said second class and to provide implementations of said virtual functions from said second class; and a factory class to allow said users to create multiple instance of said first class, said factory class constructor operable to perform assertion and parameter type checking for said first class, and wherein constructor parameters of said first class are operable to receive instances of said second factory class.

* * * * *